Figure 1:
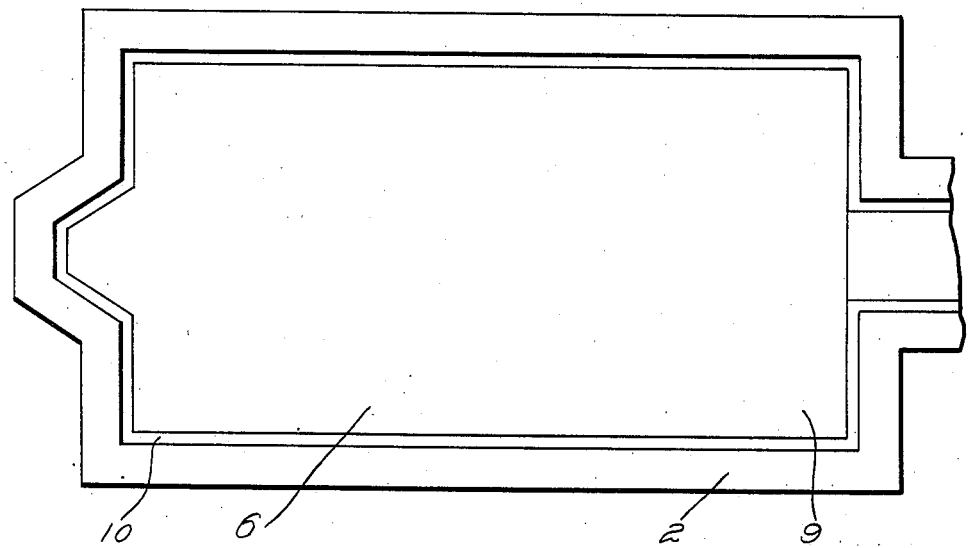

June 29, 1943.   P. G. WILLETTS   2,323,265
CONTAINER FOR MOLTEN GLASS
Filed March 28, 1938

Witness
W. B. Thayer.

Inventor
Paul G. Willetts
by Brown Parham
Attorneys

Patented June 29, 1943

2,323,265

UNITED STATES PATENT OFFICE 2,323,265

CONTAINER FOR MOLTEN GLASS

Paul G. Willetts, West Hartford, Conn., assignor to Hartford-Empire Company, Hartford, Conn., a corporation of Delaware Application March 28, 1938, Serial No. 198,376

13 Claims. (Cl. 49—54)

This invention relates to containers for molten glass, such as continuous tank furnaces, forehearths and the like, and more particularly relates to the construction of the bottom and side walls of such containers.

In my application filed March 2, 1936, Serial No. 66,662, on which Patent No. 2,262,826 was granted, November 18, 1941, I have described a novel arrangement for glass tank furnaces and other containers for molten glass, wherein the bottom is composed of granular material as distinguished from the formed blocks previously employed for constructing the bottoms of tank furnaces and like containers.

The present invention is an improvement on the general bottom-forming system disclosed in the above-identified prior application and aims particularly to improve the granular bottom in respect to the union between the bottom and the side walls, while retaining the durability and capacity for adequate insulation which characterize the prior invention.

An object of this invention is to provide a container for molten glass having side walls and a granular bottom, the material forming the bottom being of such composition as to react chemically with the material composing the side walls, so as to unite the side walls and the bottom without substantial cracks therebetween.

More specifically, an object of this invention is to provide a container for molten glass having side walls and a granular bottom in which the material composing the bottom consists, at least in the region adjacent the side walls, of granular refractory material in which the grains are composed of separable phases, one phase being crystalline and the other phase being glassy; the glassy phase and the material composing the adjacent side walls being capable of reacting to unite the side walls and the bottom without the formation of cracks therebetween.

A still further object of this invention is to provide a structure having the side walls and bottom constructed as heretofore described, with the additional feature that the major portion of the bottom is composed of refractory grains which will not react chemically with one another under the temperatures and pressures present when the container is in use, this major portion of the bottom being united to the side walls by a marginal portion composed of granular material having separable phases, one of which is of a glassy nature and adapted to unite both with the material composing the side walls and with the material composing the major portion of the bottom, so as to unite all three materials together without substantial cracks therebetween.

The advantage of thus avoiding cracks at the junction between the granular bottom and side walls is that molten glass is prevented from seeping between the bottom and the side walls. Such seepage of glass greatly increases the erosion of the side walls and such erosion is prevented by the construction of the present invention.

Figure 2:
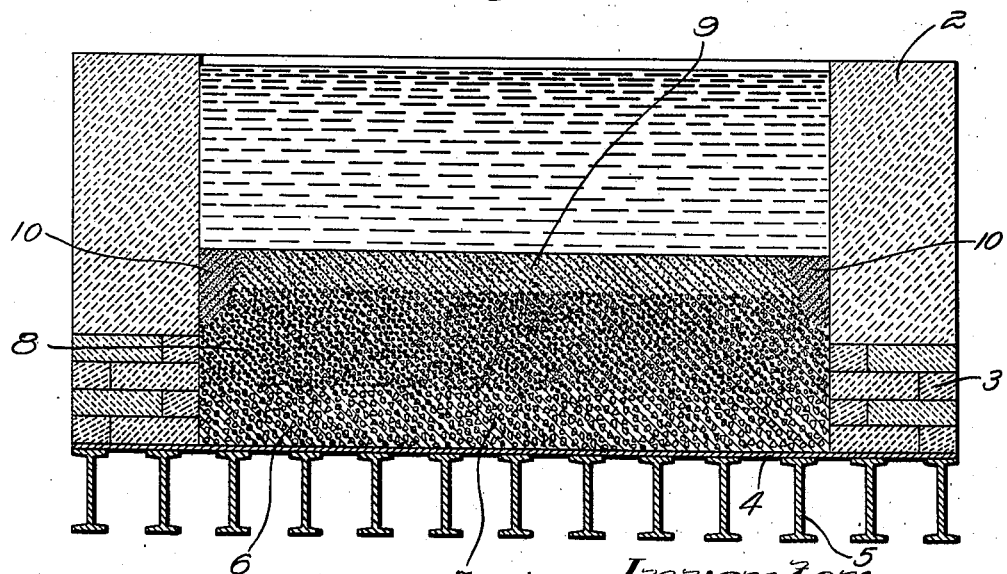

In the accompanying drawing,

Figure 1 is a diagrammatic plan view of a glass tank furnace constructed in accordance with the present invention; and Figure 2 is an enlarged transverse vertical section through said tank furnace.

The furnace shown in the drawing includes refractory side wall blocks 2 supported upon brickwork 3, which in turn is supported upon a metallic plate 4 resting upon I-beams 5.

Upon the supporting plate 4 and between the side walls 2 is a refractory bottom 6 composed of granular material, tamped or otherwise firmly placed, and preferably, although not necessarily, consisting of superimposed layers of material selected to give the desired insulating and glass-resisting properties. Thus the lower layer 7 in contact with the supporting plate 4 may be composed of insulating material which need not have any substantial resistance to molten glass, and above this layer there may be a layer 8 of grog aggregate also having substantial heat-insulating capacity and, in addition, being sufficiently resistant to the action of molten glass to prevent rapid penetration in case molten glass should come into contact with it. Such grog aggregate may be made by crushing ordinary flux block material or may consist of grog such as would ordinarily be used in making common clay flux blocks.

Above the grog aggregate layer 8, there is shown a final glass-contacting layer 9 composed of granular material which, in one embodiment of this invention, may consist of grains composed of separable crystalline and glassy phases, such, for example, as crushed electrocast alumina-silica material, such as is manufactured by the Corhart Refractories Company of Louisville, Kentucky. Such grains may be made by crushing waste material formed incidentally to the manufacture of electrocast refractory blocks, or the grains may be made directly from molten electrocast material, as by granulation in water or by pouring and crushing, in which case the exact composition of the material may be modified to give the proportions of crystalline and glassy phases desired for particular uses in forming glass container bottoms according to the present invention.

The side wall blocks 2 may be composed of any refractory which is suitable for contact with molten glass and which is capable of reacting with the granular bottom material to unite the side walls and the bottom. Thus the side wall blocks may be composed of electrocast silica-alumina material, such as the Corhart material mentioned above, or may be composed of ordinary clay flux blocks.

When the bottom of the container, or that portion thereof, such as the layer 9, to be in contact with molten glass, is thus composed of grains having a separable glassy phase, this glass reacts with the material composing the side walls 2 under the temperatures and pressures developed when the furnace or other container is heated and filled with glass. Such reaction unites the side walls and the bottom and prevents the formation of cracks at the junction between the side walls and the bottom, which would otherwise tend to appear on account of shrinkage of the material composing the side walls or the material composing the bottom or both.

According to another embodiment of this invention, the major portion of the bottom 6 or of the upper layer 9 thereof may be composed of granular material which does not have a separable glassy phase at the temperatures and pressures encountered in the use of the furnace, the desired union between the granular bottom material and the side wall blocks being effected by interposing between them a strip 10 of granular material having a separable glassy phase, this marginal strip being composed of granules that are similar to those described above and being capable of reacting both with the side wall material and with the bottom granular material to unite all three together without the formation of substantial cracks under the temperatures and pressures encountered in the use of the furnace.

Granular material suitable for this use in connection with a marginal strip of other material having a separable glassy phase is shown in my Patent No. 1,893,313, dated January 3, 1933. Another material suitable for this use is calcined alumina in grains of suitably graded sizes mixed to give a large proportion of solid material and a small proportion of voids when the material is tamped in place.

Another material suitable for use in either modification of this invention is a mixture of electrocast silica-alumina grains and calcined alumina, both in graded sizes so as to produce an intimate and dense mixture. For example, such a material may be made by mixing 85 parts of Corhart electrocast grains, in graded sizes, with 15 parts of calcined alumina. For this purpose, the 85 parts of electrocast grains may be graded so that 25 parts pass through a 1 inch mesh screen and remain on a ½ inch mesh screen, 25 parts pass through a ¼ inch mesh screen and remain on a ⅛ inch mesh screen and 35 parts pass through a 60 mesh screen. The 15 parts of alumina to be mixed with the electrocast material may be of such fineness as to pass through a 100 mesh screen.

Such a mixture of crushed electrocast material and alumina has the advantage that the separable siliceous glassy phase of the electrocast grains is available to unite not only with the side wall material but with the alumina grains, thus producing substantial amounts of mullite in addition to the crystals already in the electrocast grains and producing a final material that is largely composed of mullite and a very small amount of glass.

The electrocast grains may also contain other substances such as corundum crystals, zirconia, etc., so long as the grains contain a glassy phase capable of reacting with alumina under heat.

When a marginal strip 10 is used in connection with the material composed of electrocast grains and alumina, such marginal strip may consist of the electrocast grains alone or such electrocast grains mixed with an amount of alumina the same or less than was used in the material composing the remainder of the bottom.

The marginal strip 10, if used, may be blended with the material composing the remainder of the bottom, although this is not necessary, as the inter-growth between the two materials will, in most cases, be sufficient to unite them whether they are blended or not. The marginal strip, if used, may be placed by slip-casting or by tamping. If desired, a thin vitreous layer of glass or glass-forming material may be placed on the surface of the granular bottom, as described in my above identified prior application.

In assembling the bottom materials for carrying out this invention, it is highly desirable that the granular material be composed of grains in proper size and arrangement to cause the bottom to occupy the same space between the cold condition when the bottom is built and the final heated condition of the furnace, this being accomplished by suitable selection of the materials in respect to their shrinkage under heat and in respect to the size and relative proportions of the grains. Some bulk expansion of the bottom material is permissible while the furnace is being heated up, as granular material necessarily contains considerable void spaces which enable the granular material to expand without dislodging the side blocks or causing any other damage.

The structures and materials herein specifically shown are disclosed by way of example only and not in limitation of this invention, which is defined by the scope of the appended claims.

I claim:

1. A container for molten glass having a bottom which, at least in its upper glass-engaging portion, before being heated, comprises a mixture of granular material, some of said material being composed of grains having an inert phase and a glassy phase, and some of said material being composed of grains capable of reacting under heat with the glassy phase of said first-named grains to produce refractory crystals.

2. A container for molten glass having a bottom which, at least in its upper glass-engaging portion, before being heated, comprises a mixture of granular material, some of said material being composed of grains having a crystalline phase and a glassy phase, and some of said material being composed of grains capable of reacting under heat with the glassy phase of said first-named grains to produce additional crystals.

3. A container for molten glass having a bottom which, at least in its upper glass-engaging portion, before being heated, comprises a mixture of granular material, said material being composed of electrocast grains containing corundum crystals and siliceous glass, said grains being mixed with finely divided alumina and said material being capable of reacting under heat to produce mullite crystals.

4. A container for molten glass having a bottom which, at least in its upper glass-engaging portion, before being heated, comprises a mixture of granular material, said material being composed of electrocast grains containing mullite crystals and siliceous glass, said grains being mixed with finely divided alumina and said material being capable of reacting under heat to produce additional mullite crystals.

5. A container for molten glass having a bottom which, at least in its upper glass-engaging portion, before being heated, comprises a mixture of granular material, said material being composed of about 85 parts of electrocast alumina-silica grains, in graded sizes, mixed with about 15 parts of finely divided alumina, said electrocast grains containing mullite crystals and siliceous glass, the sizes of said electrocast grains being in the order in which 25 of said 85 parts pass 1 inch screen and remain on ½ inch screen, 25 of said 85 parts pass ¼ inch screen and remain on ⅛ inch screen, and 35 of said 85 parts pass through 60 mesh screen, and the said 15 parts of alumina being of such fineness as to pass through a 100 mesh screen, the glass of said electrocast grains being capable of reacting under heat to produce additional mullite crystals.

6. The method of building the bottom of a container for molten glass, which comprises supporting from beneath a layer of granular refractory material of a type which, when out of contact with molten glass, will remain largely in loose and unsintered condition throughout the mass thereof under the temperatures and pressures to which such material will be subjected during the use of the container, mixing granular electrocast grains, containing mullite crystals and siliceous glass, with finely-divided alumina, forming at least a portion of the glass-engaging part of the bottom of the container above said first layer with the resulting mixture, and heating the container sufficiently to cause reaction between the siliceous glass of said electrocast grains and the finely-divided alumina, thus producing additional mullite crystals and reducing the amount of glass in the material.

7. The method of building the bottom of a container for molten glass, which comprises supporting from beneath a layer of granular refractory material of a type which will react at its upper part with molten glass coming into contact therewith to form a glass-impervious layer over the original layer of less thickness than said original layer and will remain largely loose and unsintered throughout the mass thereof beneath said glass-impervious layer under the temperatures and pressures to which such material will be subjected during the use of the container, mixing granular electrocast grains, in graded sizes and containing mullite crystals and siliceous glass that is capable of separating from said grains under heat, with finely-divided alumina, firmly compacting the resulting mixture in the bottom of the container above at least part of the material of the first layer so as to expose said mixture to contact with molten glass over at least a part of the area of said bottom, and heating the container sufficiently to cause reaction between the siliceous glass of said electrocast grains and the finely-divided alumina, thus producing additional mullite crystals and reducing the amount of glass in the material.

8. The method of building the bottom of a container for molten glass, which comprises supporting from beneath a layer of granular refractory material of a type which will react at its upper part with molten glass coming into contact therewith to form a glass-impervious layer over the original layer of less thickness than said original layer and will remain largely loose and unsintered throughout the mass thereof beneath said glass-impervious layer under the temperatures and pressures to which such material will be subjected during the use of the container, intimately mixing about 85 parts of electrocast grains, in graded sizes and containing mullite crystals and siliceous glass that is capable of separating from said grains under heat, with about 15 parts of finely divided alumina, the sizes of said electrocast grains being in the order in which 25 of said 85 parts pass 1 inch screen and remain on ½ inch screen, 25 of said 85 parts pass ¼ inch screen and remain on ⅛ inch screen, and 35 of said 85 parts pass through 60 mesh screen, and the said 15 parts of alumina being of such fineness as to pass through a 100 mesh screen, firmly compacting the resulting mixture in the bottom of the container above at least part of the material of the first layer so as to expose said mixture to contact with molten glass over at least a part of the area of said bottom, and heating the container sufficiently to cause reaction between the siliceous glass of said electrocast grains and said finely divided alumina, thus producing additional mullite crystals and reducing the amount of glass in the material.

9. A container for molten glass comprising refractory side walls, a bottom support, and a refractory bottom carried by the support and extending between and in contact with said side walls, said refractory bottom comprising a subsurface layer of substantial depth of grains of such composition that they will remain largely in loose and unsintered condition throughout the mass during use of the container and a surface layer of granular refractory material which will react with molten glass coming into contact therewith to form a glass-impervious vitreous layer, the granular refractory material of at least the marginal portion of said surface layer also having a glassy phase capable of reacting with the material of the side walls to unite therewith without any substantial cracks therebetween when the container is heated to the temperature of use.

10. A container for molten glass comprising refractory side walls, a bottom support, and a refractory bottom comprising a layer of substantial depth of loose granular refractory material carried by said support so as to extend between and in contact with said refractory side walls and of such composition that such granular material will remain largely in loose and unsintered condition throughout the mass during use of the container, and an upper layer of loose granular refractory material also extending between and in contact with said side walls and of a different composition which is such that the grains thereof are composed of at least two separable phases, one of which is a glassy phase capable of reacting with the material of the refractory side walls so as to unite the side walls and the bottom without substantial cracks therebetween when the container is heated to the temperature of use.

11. A container for molten glass comprising refractory side walls, a bottom support, and a refractory bottom comprising loose granular refractory material carried by the support and extending between and in contact with said side walls, a marginal strip of the refractory granular material extending adjacent to said side walls from the upper surface of said refractory bottom for part of the thickness thereof comprising grains having a separable glassy phase capable of reacting under the temperatures and pressures encountered in the use of the container both with the material of the side walls and with the granular material within the confines of said marginal strip to unite all three together without the formation of substantial cracks between any two of them, the granular material within the confines of said strip comprising refractory grains which will not react with one another under said temperatures and pressures but will react under such temperatures and pressures with the glassy phase of the grains of the surrounding strip to unite therewith and with such molten glass in the container as comes into contact therewith to form a glass-impervious layer.

12. A container for molten glass comprising refractory side walls, a bottom support, and a refractory bottom comprising a plurality of layers of loose granular material carried by the support and extending between and in contact with said side walls, the granular material of the uppermost of said layers being sufficiently resistant to the action of molten glass coming into contact therewith to prevent rapid downward penetration thereinto of such glass and also, at least in the region adjacent to said side walls, comprising refractory grains having a crystalline phase and a separate glassy phase, the latter being capable of reacting with the material of the side walls to unite therewith without substantial cracks therebetween when the container is heated to the temperature of use, the granular material of a lower layer having good heat insulating properties and being of such composition and characteristics as to remain largely in loose and unsintered condition throughout its mass at normal operating temperatures of the container.

13. A container for molten glass comprising refractory side walls, a bottom support, and a bottom carried by said support and extending between and in contact with the side walls, said bottom comprising a lower layer of granular heat insulating material which need not have any substantial resistance to molten glass, an intermediate layer of grog aggregate having substantial heat insulating capacity and, in addition, being sufficiently resistant to the action of molten glass to prevent rapid penetration in case molten glass should come into contact therewith, and an upper layer comprising an outer marginal portion next to the side walls comprising grains of electro-cast material having separable crystalline and glassy phases, the remaining portion of said upper layer comprising refractory granular material of a type which will react in the presence of heat with molten glass coming into contact therewith to form a vitreous layer impervious to the molten glass.

PAUL G. WILLETTS.